United States Patent Office 2,945,752
Patented July 19, 1960

2,945,752
CONTROL OF WILD OATS

Dorsey R. Mussell, Clare, Mich., assignor to The Dow Chemical Company, Midland, Mich., a corporation of Delaware No Drawing. Filed Mar. 8, 1956, Ser. No. 570,211

5 Claims. (Cl. 71—2.3)

This invention is concerned with the control of wild oats and is particularly directed to the application of 1,2,4,5-tetrachlorobenzene for preventing the growth of the seeds and emerging seedlings of wild oats.

Wild oats is an annual weed which has steadily spread across the prairie lands of North America during the last half century. Unlike most other annual weeds, wild oats has proved resistant to pre-emergence application of 2,4-dichlorophenoxy-acetic acid and the other weed killing chemicals now available. The annual loss among North American farmers attributable to this grass-like weed approaches a quarter of a million dollars. The weed infests more than forty million acres in Canada and more than twenty million acres of prairie land in the United States. Thus, the necessity for a method for the control of wild oats is well recognized by the agriculturalist.

The use of halobenzenes for the treatment of seed grains is disclosed in United States Patent 1,947,926. In such use the seed grains are dressed with compositions containing halobenzenes such as hexachlorobenzene, tetrabromobenzene, and tetra-halogeno-benzene. The treatment is taught to control the fungal type diseases of smut of wheat (*Tilletia tritici*) and *Fusarium nivale* of rye.

It is an object of the present invention to provide a new and improved method for the suppression and control of the growth of wild oats. A further object is to provide a method for preventing the growth of the seeds and emerging seedlings of wild oats. Another object is the provision of a method for the suppression of the growth of the seeds and emerging seedlings of wild oats in soil or growth media which is planted with the seeds of broad leaf crop plants. An additional object is the provision of novel compositions to be employed for the accomplishment of the new method of controlling the growth of wild oats. Other objects will become apparent from the following specification and claims.

According to the present invention, it has been discovered that the growth of the seeds and emerging seedlings of wild oats may be controlled by exposing the seeds and emerging seedlings to the action of 1,2,4,5-tetrachlorobenzene. The latter compound is a crystalline solid material melting at 139°–140° C., somewhat soluble in many organic solvents and of very low solubility in water. It has been found to have a very high degree of toxicity against the seeds and emerging seedlings of wild oats and a very low toxicity for the seeds of many crop plants. Thus, the compound may be employed for the selective control of the growth of the seeds and emerging seedlings of wild oats in growth media planted with the seeds of broad leaf crop plants such as peas, cotton, beans, and corn. Also, the compound is adapted to be readily and conveniently distributed in soil or growth media for the control of the growth of wild oats. Further, the isomers of 1,2,4,5-tetrachlorobenzene such as 1,2,3,4-tetrachlorobenzene and 1,2,3,5-tetrachlorobenzene have been found to be without substantial herbicide activity.

The introduction of 1,2,4,5-tetrachlorobenzene in soil gives rise to varying degrees of response in seeds, emerging seedlings and growing plants depending upon the nature of the plant and the concentration of the compound in the growth medium. When the compound is dispersed in growth media, in high concentrations, a temporary suppression of the growth of many seeds and plants is obtained. The weathering action of the sun and rain, and possibly the decomposition of the toxic compound by bacteria and other soil organisms eventually frees the growth medium of the toxicant. Lower concentrations of the 1,2,4,5-tetrachlorobenzene compound prevent the growth of the seeds and emerging seedlings of wild oats while having little or no effect upon the growth of the seeds and emerging seedlings of many broad leaf crop plants. Thus, it is possible to accomplish a selective control of wild oats in the presence of broad leaf crop plants such as peas, beans, cotton and corn.

The lower concentrations of the tetrachlorobenzene compound in growth media exert a retarding and stunting effect upon the growth of many narrow leaf crop species. The degree of stunting is dependent upon the nature of the narrow leaf crop plant and the concentration of the tetrachlorobenzene compounds in the soil. Where the treated soil is to be planted to flax, wheat or barley, the planting operation should not be carried out for a period of from 2 to 4 weeks following the treatment, the exact period depending upon the concentration of the benzene compound in the soil. When following such practice, the wild oats may be controlled without substantial injury to the grain crops.

In a particularly advantageous method of operation, the treatment of the soil with the tetrachlorobenzene compound is carried out after harvest. At this time the wild oat plants have matured and their seeds have been scattered on the soil surface in the fields. Following such post-harvest treatment, the fields may be planted in the fall or spring in accordance with conventional procedure. Such practice gives excellent control of wild oats.

The distribution of a growth inhibiting amount of the 1,2,4,5-tetrachlorobenzene compound in soil or growth media is essential and critical for the practice of the present invention. In non-selective applications to growth media, good results are obtained when the benzene compound is supplied in the amount of from about 8 to 300 parts or more by weight per million parts by weight of the media. In applications to field soil, good results are obtained when the tetrachlorobenzene compound is distributed at a rate of five pounds per acre and through such a cross section of the soil as to provide for the presence therein of an effective concentration of the treating agent. In field applications, it is desirable that the benzene compound be distributed to a depth of at least 0.5 inch and at a substantially uniform concentration of at least 1.7 pounds per acre inch of soil.

In selective applications for the control of the growth of the seeds and emerging seedlings of wild oats in areas planted or to be planted with the seeds of many broad leaf plant species, a concentration of from about 8 to about 50 parts by weight of toxicant per million parts by weight of growth medium may be employed. In such applications, the exact concentration to be employed is dependent upon the resistance of the seeds and emerging seedlings of the broad leaf crop plants to the tetrachlorobenzene compound.

The method of the present invention may be carried out by applying to and mixing with the growth media the unmodified tetrachlorobenzene compound. However, the present method also embraces the employment of liquid or dust compositions containing the toxicant. In such usage, the tetrachlorobenzene compound may be modified with one or a plurality of additaments or herbicide adjuvants such as water, organic solvents, petroleum distillates, or other liquid carriers, surface active dispersing agents, and finely divided solids. Depending upon the concentration of toxicant, such modified compositions are adapted to be distributed in soil, or employed as concentrates and subsequently diluted with additional inert carrier to produce the ultimate treating compositions. The required amount of the tetrachlorobenzene compound in the growth media conveniently may be supplied, per acre treated, in from 40 to 27,000 gallons or more of liquid carrier or in from about 50 to 2,000 pounds or more of the inert solid carrier.

The exact concentration of the tetrachlorobenzene compound to be employed in compositions for the treatment of growth media is not critical and may vary considerably provided the required dose of effective agent is supplied in the soil. The concentration of toxicant in liquid compositions employed to supply the desired dosage generally is from about 0.001 to 50 percent by weight, although as high a concentration as 90 percent by weight may be employed. In solid compositions, the concentration of toxicant may be from about 1 to 50 percent by weight. In compositions to be employed as concentrates, the benzene compound may be present in a concentration of from about 5 to 95 percent by weight.

Liquid compositions containing the 1,2,4,5-tetrachlorobenzene compound may be prepared by dissolving the toxicant in an organic liquid such as xylene or petroleum distillates, or by dispersing the toxicant in water with the aid of a suitable surface-active dispersing agent such as an ionic or non-ionic emulsifying agent. The aqueous compositions may contain one or more water-immiscible solvents for the benzene compound. In such compositions, the carrier comprises an aqueous emulsion, i.e. a mixture of water-immiscible solvent, emulsifying agent and water.

The choice of dispersing and emulsifying agent and amount thereof employed is dictated by the nature of the composition type and by the ability of the agent to facilitate the dispersion of the compound in the aqueous carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of solid compositions, the tetrachlorobenzene compound is dispersed in and on a finely divided inert solid such as talc, chalk, gypsum, vermiculite, ground walnut shells, commercial fertilizer and the like. In such operations, the carrier is mixed with the toxicant in finely divided forms, mechanically ground with the toxicant, or wet with a volatile organic solvent solution thereof. Similarly, dust compositions containing the toxicant may be prepared from various of the solid surface-active dispersing agents, such as bentonite, fuller's earth, attapulgite and other clays. Depending upon the proportions of ingredients these compositions may be employed as concentrates and subsequently diluted with additional solid surface-active dispersing agent or with talc, chalk or gypsum and the like to obtain the desired amount of active ingredient in a composition adapted to be applied for the control of vegetative growth. Also, the dust compositions may be dispersed in water with or without the aid of a dispersing agent to form spray mixtures.

When operating in accordance with the present invention, growth inhibiting amounts of the tetrachlorobenzene compound or a composition containing the toxicant are dispersed in any convenient fashion in soil or other growth media, i.e. by simple mixing with the growth media, by applying to the surface of soil and thereafter dragging or discing into the soil to the desired depth, or by employing a liquid carrier to accomplish the penetration and impregnation. The application of the spray and dust compositions may be carried out by conventional methods, e.g. with power dusters, boom or hand sprayers and spray dusters.

In a further method, the distribution may be accomplished by introducing the toxicant in the water employed to irrigate the soil. In such procedure, the amount of water may be varied in accordance with the porosity and water holding capacity of the soil in order to obtain the desired depth of distribution of the toxicant.

The following examples illustrate the invention but are not to be construed as limiting.

*Example I*

Fifty parts by weight of 1,2,4,5-tetrachlorobenzene, 45 parts of fuller's earth, 2 parts of an alkyl aryl sulfonate (Nacconol NR) and 3 parts of a polymerized sodium salt of substituted benzoid alkyl sulfonic acid (Daxad No. 27) were mechanically mixed and ground together to prepare a concentrate composition in the form of a wettable powder. This composition was dispersed in water to produce two aqueous spray compositions containing 20 and 40 pounds of the tetrachlorobenzene compound per 100 gallons of ultimate mixture. These aqueous spray compositions were employed for the treatment of field soil of good nutrient content which was heavily infested with wild oat seeds. In such operations the compositions were applied to the surface of separate areas in a field at the rates of 10 and 20 pounds of the tetrachlorobenzene compound per acre. A portion of the field was left untreated to serve as a check. Following the treating operations the field was rototilled to distribute the tetrachlorobenzene in the soil.

After seven weeks the field was examined to ascertain what control of the growth of wild oats had been obtained. The examination showed a 99.5 and 95 percent control of wild oats at dosages of 20 and 10 pounds of 1,2,4,5-tetrachlorobenzene per acre, respectively. In the untreated portion of the field there was found a heavy stand of wild oat plants which were from 8 to 12 inches tall.

*Example II*

Twenty-five parts by weight of 1,2,4,5-tetrachlorobenzene, 71 parts of fuller's earth, 2 parts of Nacconol NR and 2 parts of Daxad No. 27 were mechanically mixed and ground together to prepare a concentrate composition in the form of a wettable powder. In a similar manner wettable powder concentrates were compounded containing 1,2,3,5-tetrachlorobenzene, 1,2,4,5-tetrabromobenzene, and 1,2,3,4-tetrachlorobenzene.

Portions of these concentrate compositions were dispersed in water to produce aqueous compositions containing various amounts of each of the tetrahalobenzene compounds per 100 gallons of ultimate mixture. The aqueous compositions were employed for the treatment of sandy loam soil of good nutrient content for the control of the growth of wild oats. In such operations, the compositions were applied to the soil areas as a soil drench and at a rate of about 0.43 acre-inch of aqueous composition per acre to supply various amounts of tetrahalobenzene compounds per acre and various concentrations in the treated soil. Immediately prior to the applications, the soil areas had been prepared and seeded to wild oats. Other areas similarly prepared and seeded to wild oats were left untreated to serve as checks.

After three weeks, the treated areas were examined to ascertain what control of the growth of seeds and emerging seedlings had been obtained. The results are set forth in the following table:

| Benzene Compound | Amount of Benzene Compound in Pounds per Acre | Concentration of Benzene Compound in Soil in parts by weight per Million parts by weights of soil | Percent Control of Growth of Wild Oats |
|---|---|---|---|
| 1,2,3,4-Tetrachlorobenzene | 50 | 82 | 0 |
|  | 25 | 41 | 0 |
| 1,2,3,5-Tetrachlorobenzene | 50 | 82 | 10 |
|  | 12.5 | 20.5 | 0 |
| 1,2,4,5-Tetrabromobenzene | 50 | 82 | 0 |
|  | 12.5 | 20.5 | 0 |
| 1,2,4,5-Tetrachlorobenzene | 50 | 82 | 100 |
|  | 12.5 | 20.5 | 80 |

At the time of the observations, the check areas were found to support luxuriant and vigorously growing stands of wild oats.

Example III

Fifty parts by weight of 1,2,4,5-tetrachlorobenzene, 47.4 parts of fuller's earth, 1.3 parts of Nacconol NR and 1.3 parts of Daxad No. 27 were mechanically mixed and ground together to prepare a concentrate composition in the form of a wettable powder. A portion of this concentrate composition was dispersed in water to prepare an aqueous composition containing 2 pounds of the benzene compound per 100 gallons of ultimate mixture. Portions of this aqueous composition were employed for the treatment of soil for the control of the growth of the seeds and emerging seedlings of various plant species. In such operations the aqueous composition was sprayed upon the surface of soil areas in amounts sufficient to supply 20 and 10 pound treatments of the tetrachlorobenzene compound per acre. Immediately prior to the applications, the soil areas had been prepared and seeded to the named plant species. Other areas similarly prepared and seeded were left untreated to serve as checks. After three weeks, the treated areas were examined to ascertain what control of the growth of seeds and emerging seedlings had been obtained. The results are set forth in the following table.

| Seed Species | Percent Control of Growth by the Tetrachlorobenzene Compound at the Indicated Pounds per Acre | |
|---|---|---|
|  | 10 lbs. | 20 lbs. |
| Soybeans | 0 | 0 |
| Peas | 0 | 0 |
| Cotton | 0 | 0 |
| Cucumber | 0 | 0 |
| Corn | 0 | 0 |
| Navy beans | 0 | 0 |
| Wild Oats | 98 | 98 |

At the time of observation, abundant stands of the named plant species were found in the check areas.

Example IV

Finely ground 1,2,4,5-tetrachlorobenzene was mechanically mixed with diammonium phosphate, $(NH_4)_2HPO_4$, to produce a finely divided solid composition containing 10 percent by weight of the benzene compound. This composition was employed for the treatment of soil of good nutrient content for the control of wild oats. In such operations, the composition was applied to the surface of soil areas in amounts of 10 and 5 pounds of the tetrachlorobenzene compound per acre. Following the applications, the separate areas were raked to distribute the tetrachlorobenzene compound in the soil and the areas thereafter seeded to wild oats. Other areas were similarly prepared and seeded but left untreated to serve as checks. After ten days, the treated areas were examined and 97 percent and 91 percent controls of wild oats found in the areas treated, respectively, at 10 and 5 pounds of the tetrachlorobenzene compound per acre. At the time of the observations, the check areas were found to support abundant stands of wild oats.

Example V

Finely ground 1,2,4,5-tetrachlorobenzene was mechanically mixed with a commercial fertilizer (10 percent each of nitrogen, potassium oxide and phosphorus pentoxide) to prepare a composition containing about six percent by weight of the benzene compound. This composition was employed for the control of wild oats as described in Example IV. The treating and seeding operations were all as previously described with the composition being distributed in an amount equivalent to 20 pounds of the benzene compound. Two weeks following these applications, the treated areas were examined and a 98 percent control of wild oats observed. At the time of the observations, the check areas were found to support abundant stands of wild oats.

Example VI

Finely ground 1,2,4,5-tetrachlorobenzene was mechanically mixed with attapulgite clay to prepare a composition containing 40 percent by weight of the benzene compound. This composition was employed for the control of wild oats as described in Example IV. In the soil treating operations, the composition was employed in an amount sufficient to supply 10 pounds of the tetrachlorobenzene compound per acre. After ten days, the treated areas were examined and a 91 percent control of wild oats observed. At the time of the observations, the check areas showed vigorously growing stands of wild oats.

Example VII

Portions of the wettable powder concentrate compositions containing 1,2,3,5-tetrachlorobenzene and 1,2,3,4-tetrachlorobenzene as described in Example II were employed for the treatment of sandy loam soil of good nutrient content for the control of the growth of the seeds and emerging seedlings of barley, peas, wild oats, Japanese millet and flax. In such operations, the compositions were applied to the surface of soil areas in the amount of 10 pounds of tetrachlorobenzene compound per acre. Following the applications the top surface of the soil areas were thoroughly mixed and raked to distribute the tetrachlorobenzene compounds in the soil and the areas thereafter seeded to the named plant species. Other areas were similarly seeded but left untreated to serve as checks.

After three weeks, the treated areas were examined and the stands of barley, peas, wild oats, millet and flax were found to be substantially the same as in the case of the untreated checks.

What is claimed is:

1. A method which comprises applying to and mixing with soil infested by the seeds of wild oats, a growth inhibiting amount of 1,2,4,5-tetrachlorobenzene.

2. An agronomical practice which comprises distributing in soil infested by the seeds of wild oats, a growth inhibiting amount of 1,2,4,5-tetrachlorobenzene.

3. A method claimed in claim 2 wherein the benzene compound is distributed thru the soil in the amount of at least 8 parts by weight per million parts by weight of soil.

4. A method claimed in claim 2 wherein the soil is treated with a composition comprising 1,2,4,5-tetrachlorobenzene in intimate admixture with an inert herbicide adjuvant as a carrier therefor.

5. In the practice of agricultural economy the method which comprises applying 1,2,4,5-tetrachlorobenzene to soil infested by the seeds of wild oats, the benzene compound being substantially uniformly distributed to a depth of at least 0.5 inch and in the amount of at least 1.7 pounds per acre inch of soil.

References Cited in the file of this patent

UNITED STATES PATENTS

| | | |
|---|---|---|
| 2,390,941 | Jones | Dec. 11, 1945 |
| 2,588,428 | Stewart et al. | Mar. 11, 1952 |

OTHER REFERENCES

Seydel in "Water Works and Sewerage," July 1938, pp. 688–690.

Article in J. Amer. Water Works Assn., February 1946, pp. 195–196.

Costa in "Chemical Abstracts," vol. 46, col. 11544(a), 1952.

Frear: "Catalogue of Insecticides and Fungicides," 1948, vol. I, p. 164; vol. II, p. 47.

King: "U.S. Dept. of Agriculture Handbook, No. 69, May 1954, p. 66.

Nex et al. in "Weeds," vol. III, No. 3, July 1954, pp. 241–253.